United States Patent [19]

Conn

[11] B 3,996,131

[45] Dec. 7, 1976

[54] PRECOAT FOR PERMEABILITY SEPARATION SYSTEMS

[75] Inventor: William Maxwell Conn, La Mesa, Calif.

[73] Assignee: Universal Oil Products Company, Des Plaines, Ill.

[22] Filed: May 29, 1973

[21] Appl. No.: 364,797

[44] Published under the second Trial Voluntary Protest Program on February 17, 1976 as document No. B 364,797.

Related U.S. Application Data

[63] Continuation of Ser. No. 153,789, June 16, 1971, abandoned.

[52] U.S. Cl. .............................. 210/23 H; 210/23 F
[51] Int. Cl.² ......................................... B01D 13/00
[58] Field of Search ............... 210/23, 75, 193, 321

[56] References Cited
UNITED STATES PATENTS

| | | | |
|---|---|---|---|
| 2,367,557 | 1/1945 | Atwood | 210/75 X |
| 2,470,202 | 5/1949 | Wickenden | 210/75 X |
| 2,600,085 | 6/1952 | vanDyk | 210/75 X |
| 3,101,318 | 8/1963 | Watson et al. | 210/75 X |
| 3,373,056 | 3/1968 | Martin | 210/23 X |
| 3,462,362 | 8/1969 | Kollsman | 210/23 |
| 3,490,590 | 1/1970 | Davies | 210/23 X |
| 3,537,988 | 11/1970 | Marcinkowsky et al. | 210/23 |

*Primary Examiner*—Frank A. Spear, Jr.
*Attorney, Agent, or Firm*—James R. Hoatson, Jr.; Philip T. Liggett; William H. Page, II

[57] ABSTRACT

Procedures are disclosed for preventing fouling of reverse osmosis and ultrafiltration membranes by relatively large molecules and particulate matter. In particular, absorbents are used, with and without finely divided activated carbon, to form a "precoat" on the membrane. The "precoat" is laid down on the membrane at the beginning of a reverse osmosis or ultrafiltration cycle. It is removed at the end of a cycle by flushing, preferably followed by a cleaning. The "precoat" process is applied to the ultrafiltration of raw sewage as a preferred example.

13 Claims, No Drawings

PRECOAT FOR PERMEABILITY SEPARATION SYSTEMS

This is a continuation of application Ser. No. 153,789, filed June 16, 1971, now abandoned.

BACKGROUND OF THE INVENTION

Fouling of membranes used for ultrafiltration and reverse osmosis by bulky and generally water-insoluble or hydrophobic molecules has been noted in the literature. The types of molecules which cause difficulty include, generally, any large molecule, whether having a cationic or anionic charge, amphoteric, nonionic, or hydrophobic. Virtually all oils, greases and waxes, proteins, sticky and gelatinous materials, and some larger scale-forming cations can cause difficulty. Such fouling greatly reduces the efficiency of the membrane and the separation process for which the membrane is used. Accordingly, the use of ultrafiltration and reverse osmosis for the separation or concentration of materials which include compositions such as greasy materials has been greatly restricted or entirely avoided. Prior to the present invention, no satisfactory method for avoiding the consequence of fouling by bulky materials has been known. In particular, the application of ultrafiltration and reverse osmosis processes to the treatment of sewage has been restricted because of the grease content of the sewage. Even as little as 2 ppm hydrophobic or greasy materials or other large molecules in the sewage has resulted in fouling of the membrane and breakdown of the separation process in a typical sewage containing total organics of about 300 ppm.

So-called "dynamic membranes" have been known prior to the present invention. A "dynamic membrane" may be defined as a microporous layer deposited on a porous substrate during or prior to use in a separation process by pressure through the microporous layer. A dynamic membrane is usually particulate and easily removed from the porous substrate.

Dynamic membranes are discussed by Savage et al. in "Hyperfiltration of Plant Effluents," *Water j Sewage Works*, V. 116, No. 3, (March, 1969), pp 102–106, and by Johnson et al. in U.S. Pat. No. 3,431,201.

A filter aid composition comprising two adsorbents, activated carbon and silica gel, is disclosed in French patent 2,005,394.

The formation of a "gel layer" on top of an ultrafiltration membrane has been studied by Baker and Strathman, "Ultrafiltration of Macromolecular Solutions with High-Flux Membranes," *J. App. Polymer Sci.*, V. 14, (1970), pp 1197–1214, and others. A number of materials such as various hydrous oxides and hydrolyzable metals, as well as various polyelectrolytes have been used to form dynamic membranes on rigid porous substrates. See, for example, Kuppers et al. "Filtration of Organic Solutes by Dynamically Formed Membranes," *Separation Science*, 2(5), (November, 1967), pp 617–623, wherein the use of organic polyelectrolytes, zirconium oxide, and bentonite is separately discussed, Shor et al. "Concentration Polarization in Tubular Systems with Dynamically Formed Membranes," *I & EC Fundamentals*, V. 7, (February, 1968), pp 44–48, discussing the deposition of colloidal hydrous zirconium oxide on a porous carbon tube, and Johnson et al. "Hyperfiltration Studies XIV - Porous Tubes Precoated with Filter Aids as Supports for Dynamically Formed Membranes," *Desalination*, V. 5, (1968), pp 359–369.

Work similar to the above is disclosed in U.S. Pat. Nos. 3,449,245, 3,503,789 and 3,413,219.

Brownscombe et al., U.S. Pat No. 3,331,772, use bentonite treated with sodium polyacrylate as a preferred combination of clay and water-soluble polymer to form a precoat on a porous substrate and to repair semipermeable membranes.

Flowers et al., U.S. Pat. No. 3,457,171, disclose the use of graphite oxide, with and without a binder, to form a coating on a semipermeable membrane.

Kollsman, U.S. Pat. No. 3,462,362, deposits on a porous substrate two layers of polyelectrolytes having opposite charges. Montmorillonite and diatomaceous earth are among the materials used.

Waste products of various types, such as pulp mill wastes, have been treated by permeability separation techniques. See, for example, Wallace et al. U.S. Pat. No. 3,528,901 which discloses the use of reverse osmosis to treat effluent from a paint plant. Activated sewage sludge has also been concentrated or dewatered — also see *Water & Wastes Engineering*, (January, 1970), pp 51–52, and Hinden et al. "Organic Compounds Removed by Reverse Osmosis," *Water & Sewage Works*, V. 116, No. 12, (December, 1969), pp 466–470. Secondary sewage effluent is treated in Marcinkowsky et al. U.S. Pat. No. 3,537,988. Primary effluent is used in the Savage et al article mentioned previously. Attempts to treat raw sewage with reverse osmosis are reported in an FWQA research report entitled "Reverse Osmosis Renovation of Municipal Wastewater"; metaphosphates and polyelectrolytes are used as aids.

So far as I am aware, no natural absorbent such as kaolin clay, bentonite, montmorillonite, hectorite, diatomaceous earth or the like has been used to form a dynamic membrane on top of a pre-formed, permanent semipermeable membrane which, in turn, is on top of a porous substrate, in order to minimize fouling of the permanent membrane.

Such absorbent substances are, of course, commonly used for water treatment (see Hronas U.S. Pat. No. 3,066,095 as an example). They have also been used in processes involving activated carbon in the treatment of water, such as in Rice et al. U.S. Pat. No. 3,252,899. Sewage treatment processes which include or mention the use of both activated carbon and clay absorbents include U.S. Pat. Nos. 3,171,802, 3,142,638, and 3,337,454.

SUMMARY OF THE INVENTION

I have developed a system and composition which ensures the satisfactory operation of a reverse osmosis or ultrafiltration permanent membrane and system by effectively removing the hydrophobic and greasy materials before they can reach the membrane surface. In a preferred form of my invention a composition comprising a clay or silicious absorbent or similar materials and activated carbon may be laid upon the membrane surface smoothly and evenly through the use of a normal pressure (i.e., up to 800 psi or more) and flow throughout the reverse osmosis or ultrafiltration system. Optimum quantities for other feed solutions and concentrations of feed solutions may be determined by experimentation or observation, the most desirable quantity and concentration of precoat being that which minimizes the reduction in flux rate and prolongs the cycles. Once deposited upon the membrane surface, my composition will intercept the large hydrophobic and other undesirable molecules by absorption on the clay. Oily and other organic molecules, including dissolved materials likely to foul the membrane, will be adsorbed on the activated carbon. I may use a clay by itself in cases where it is not desired to remove certain compounds likely to be adsorbed on the activated carbon. The sewage or other mixture containing large interfering molecules may be run through the reverse osmosis or ultrafiltration unit until the precoat layer is filled to capacity with grease, oil, or other hydrophobic or interfering material causing a significant drop in the flux rate. Thereafter, it is necessary to remove the precoat by flushing it. For the flushing procedure, the pressure is generally reduced and the velocity or flow rate of water being passed through the system is increased considerably. After the flushing step, in which the exhausted precoat is discarded, a new coat is placed on the membrane and a new cycle is begun. I have found that a typical precoat comprising 6 to 60 grams of coating per 1,000 square feet of membrane surface is capable of treating approximately 10,000 gallons per day of typical sewage having 300 ppm total organics.

It is helpful to follow the flushing step with a cleaning step. A small amount of conventional laundry detergent flushed through the system will remove much of the material which may have adhered to the membrane. Preferably the cleaning material will contain enzyme, which I have found to be helpful against protein buildup on the membrane. Proteolytic enzymes, such as are used in ordinary household laundry detergents, are especially good for my purpose. They are preferably permitted to stand on the membrane for a soaking period of at least 40 to 60 minutes. Ammonium citrate or other sequestrants not normally found in laundry detergents may also be used to remove metal ions; such special additives should be harmless to the membrane and, preferably, also should be used in separate cycles. My composition may also include a dispersant, which I have found will aid in laying the precoat on the surface of the membrane. Preferably the dispersant will be an alkali metal metaphosphate, which also has the ability to sequester divalent metal ions and/or prevent scale formation by scale-forming components in solution through the "threshold effect," depending on their concentration. The quantity used will vary with conditions. For treating raw sewage, concentrations of 0.01 percent to 0.001 percent have been found useful. There is no minimum amount which is absolutely ineffective, so far as I know; the maximum amount of metaphosphate will be dictated by economics.

In the series of demonstrations below, a Havens tubular unit was used containing 64 square feet of internal membrane surface having a standard water permeation rate, from a 5,000 ppm solution of NaCl under 800 psi at 20°C, of 12 gallons per square foot per day. In operation, various pressures were used, usually about 500 to 550 psi. For comparison, it was observed that Colorado River tap water (City of San Diego) processed through the unit without additives or other treatment fouled the membrane within a relatively short time, causing the flux to drop from an initial 0.375 gallons per square foot per hour to 0.27 gallons per square foot per hour, a decrease of about 30 percent, within 16 hours. After 8 hours of cleaning, the unit returned to 90 percent of its flux.

The same unit at the same pressure suffered a decline in flux rate of over 50 percent within 12 hours when raw sewage was placed in it having 2,000 to 4,000 total dissolved solids and an undetermined quantity of suspended solids. Further, some of the fouling materials were particularly difficult to remove from the membranes; 8 hours of cleaning restored the unit to only about 70 percent flux.

The same units were used for the application of a precoat. It has been found to be feasible to prepare an appropriate precoat slurry or composition, which may be mixed together with the feed solution or composition to be treated, pass the precoat composition into the unit in the same manner as a feed solution, thereby forming a layer of precoat on the membrane, and follow with feed solution. The precoat materials I use are inexpensive enough that some of the precoat may be wasted at the concentrate end of the unit; however, in certain instances, it may be preferable to recycle this material. When applied in this manner, the precoat is not of uniform thickness throughout; it generally is thinner in the areas of higher velocities and thicker in the areas of lower velocities. Nevertheless, this condition is believed to be beneficial because, given identical pressures (which, of course, are affected by flow rates and volumes) and identical operating conditions, there will be more throughput in an area of high membrane permeability and, accordingly, the precoat will coat more thickly.

It is recommended that the tubular units be cascaded or tapered by standard techniques known in the art, to minimize the volume and flow rate differences.

San Diego tap water was run through the unit discussed above after application of a precoat consisting of 1 part diatomaceous earth (Johns-Manville Corporation's "Celite"), 1 part granular activated carbon, and 0.05 part sodium metaphosphate. The precoat was present in quantities within the unit varying from 0.014 milligram per square inch to 0.14 milligram per square inch and, in a subsequent test wherein the amount was tripled, from 0.042 to 0.42 milligram per square inch of membrane. Throughout this series, the average results with tap water were that the flux was reduced from a rate of 9 gallons per square foot per day to a rate of 8 gallons per square foot per day in an 8-hour period. With respect to raw sewage, the initial rate of 8.5 gallons per square foot per day was reduced only to 8 inches an 8-hour period.

In the following tables, the unit discussed above was operated on the feed materials designated for each table. The flux is calculated as gallons of permeate water per square foot per day, the pH and the ppm dissolved solids are of the permeate water. In calculating the product water flow, it was corrected to 26°C. The operating pressure was 500 to 550 psig throughout. The San Diego raw sewage used contained 250 to 350 ppm suspended solids, 1,500 to 4,000 TDS (including 600 to 1,200 ppm chloride), 75 to 100 ppm hexane-soluble grease and oil, 8 to 16 ppm organic detergent, 35 to 40 ppm $PO_4$, and periodic slugs of heavy bunker "C" fuel oils and septic raw sewage. The average BOD of San Diego raw sewage is 280 ppm, and the system is subject to large inputs of sea water. Readers skilled in the art will recognize this sewage as a difficult one.

TABLE 1

| | Tap Water - No Precoat | | |
| Hour | Flux Gallons/Square Foot/Day | pH | ppm Dissolved Solids |
| --- | --- | --- | --- |
| 1:10 | 9.00 | 6.6 | 250 |
| 2:10 | 8.55 | 7.2 | 120 |
| 3:10 | 7.78 | 7.4 | 90 |

TABLE 1-continued

Tap Water - No Precoat

| Hour | Flux Gallons/Square Foot/Day | pH | ppm Dissolved Solids |
|---|---|---|---|
| 4:10 | 7.74 | 7.1 | 85 |
| 5:10 | 7.82 | 7.1 | 150 |
| 6:10 | 7.77 | 7.1 | 90 |
| 7:10 | 7.74 | 7.1 | 100 |

TABLE 2

Precoat: Raw San Diego Sewage
20 grams diatomaceous earth and 1 gram metaphosphate in 100 liters tap water

| Hour | Flux Gallons/Square Foot/Day | pH | ppm Dissolved Solids |
|---|---|---|---|
| 0:30 | 9.55 | 6.3 | 320 |
| 1:00 | 8.95 | 6.25 | 340 |
| 2:00 | 8.85 | 6.5 | 380 |
| 3:00 | 7.95 | 6.5 | 420 |
| 4:00 | 7.72 | 6.5 | 420 |
| 5:00 | 7.49 | 6.45 | 380 |

TABLE 3

Precoat: Raw San Diego Sewage
20 grams diatomaceous earth, 20 grams granular activated carbon, and 1 gram sodium metaphosphate in 100 liters tap water

| Hour | Flux Gallons/Square Foot/Day | pH | ppm Dissolved Solids |
|---|---|---|---|
| 0:30 | 9.58 | 5.75 | 190 |
| 1:00 | 8.89 | 6.5 | 325 |
| 2:00 | 7.98 | 6.3 | 550 |
| 3:00 | 8.19 | 6.4 | 360 |
| 4:00 | 7.68 | 6.7 | 265 |
| 5:00 | 8.00 | 6.6 | 330 |
| 6:00 | 7.48 | 6.55 | 360 |
| 7:00 | 6.90 | 6.6 | 335 |
| 8:00 | 7.16 | 6.45 | 440 |

To remove the precoat, the pressure may be dropped or the velocity increased by opening a flow-restricting valve at the downstream end of the unit. The system may then be cleaned.

My invention permits the efficient removal of phosphate from sewage as may be seen from Table 4, showing results on a 20,000 gallons per day pilot unit using my 1:1 clay to carbon precoat composition, which was laid on the membrane surface at thicknesses averaging about 0.1 milligram per square inch.

TABLE 4

Phosphate Removal (as $PO_4$ milligram per liter)

| Date | Raw Sewage | Product Water Stage I | Stage II | Composite | Brine |
|---|---|---|---|---|---|
| 1/21/71 | 23.5 | | | & 0.0 | |
| 1/21/71 | 26.5 | | | 0.0 | |
| 3/12/71 | 11.0 | | | 2.0 | 23.0 |
| 4/1/71 | 31.0 | 0.13 | 1.35 | 0.54 | 55.0 |
| 4/7/71 | 32.0 | 0.65 | 0.95 | 0.75 | |
| 4/13/71 | 41.0 | | | 1.10 | 3.0 |

| Date | Raw Sewage Ortho | Poly | Product Water Stage I Ortho | Poly | Stage II Ortho | Poly | Composite Ortho | Poly | Brine Ortho | Poly |
|---|---|---|---|---|---|---|---|---|---|---|
| 4/1/71 | 26.5 | 4.5 | .08 | .05 | .30 | 1.05 | | | 54.0 | 1.0 |
| 4/7/71 | 25.5 | 6.5 | .13 | .52 | .23 | .72 | | | | |
| 4/13/71 | 36.0 | 5.0 | | | | | .20 | .90 | 63.0 | 20.0 |

Thus, it may be seen that my invention comprises compositions and processes for the aid of permeability separation systems such as reverse osmosis and ultrafiltration. The preferred compositions comprise (a) an absorbent clay, examples of which are kaolin clay, montmorillonite, bentonite, and diatomaceous earth, (b) finely divided activated carbon, which may be defined as carbon which has been activated so as to have a pore volume of 70 to 100 mils per gram and a total surface area of at least 500 square meters per gram, and (c) an optional amount of a dispersing phosphate. About 80 to 90 percent of the composition should pass a 325 mesh screen.

Materials which are able to absorb large molecules from solutions or mixtures of liquids are generally thought to be high surface area materials with derive their absorptive properties primarily from the spaces between molecules or other structural characteristics, rather than any particular physical or chemical attraction. Absorptive materials are therefore chemically more or less neutral with respect to the material they pick up or occlude; their action may be thought as similar to a sponge.

The property of adsorption, on the other hand, is generally applied where there is a physical attraction to a surface of the adsorbent. The physical attraction, sometimes known, as in the case of activated carbon, as van der Waals forces, is enhanced by the type of material, the amount of surface area per unit of volume, and the pore structure of the material. Another term which may be applied to the arts of adsorption and absorption is "chemisorption," which implies that there is a chemical attraction between the adsorbent and the material being adsorbed, known as the adsorbate. Although such materials as ion exchange resins, which are manufactured for the purpose of water softening and other ion exchange purposes, are sometimes referred to as adsorptives or absorptives, their use is not contemplated in my invention. Other materials having "chemisorptive" properties may be included, however, within the definition of absorbents used within this specification.

Adsorbents useful in my invention are sometimes classified into polar and non-polar types. The polar types exhibit their adsorptive properties primarily because of ionic sites on the surface. The non-polar types exhibit their properties primarily because of "dispersion" or van der Waals forces. Some authors will list within the polar types alumina, barium sulfate, calcium carbonate, glass, ion exchange resins, quartz, silica gel, titanium dioxide, and other metallic oxides, natural zeolites, etc. Among the non-polar adsorbents are carbon blacks, charcoals, graphite, activated carbon, organic resins and plastics, paraffin, metallic sulfides and talc. Adsorbents may also be said to include the following: blood charcoal, bone char, bone black, bone mineral, charcoal, animal charcoal, wood charcoal, carbons or chars from almost any vegetable substance, and activated carbons.

Other useful materials which may be designated as absorbents include the natural clays. The natural clays may be prepared in powder form or as flakes or as a freeze-dried powder. Any of the hydrous aluminum silicate clays which are naturally found, for example, among the bauxite group of clays may be listed: alumogel, bauxite, boehmite, cliachite, diaspore, diasporogelite, gibbsite, hydrargillite, α-kliachite, β-kliachite, sporogelite. Also within the clay minerals group are the halloysite clays, namely: allophane, endellite, halloysite, hydrated halloysite, hydrohalloysite, indianite, metahalloysite, schrotterite. Also the illite group: brammallite, bravaisite, glimmerton, hydromica, illite, and sericite. The kaolinite group includes: anauxite, carnat, clayite, collyrite, dickite, ferrikaolinite, ionite, kaolin, kaolinite, marge porcellana, metakaolinite, metanacrite, microvermicullite, nacrite, neokaolin, pholerite, prokaolin, rectorite, severite, terra porcellana, and terra samia. The montmorillonite group comprises: amargosite, beidellite, bentonite, chloropal, erinite, ferromontmorillonite, hectorite, magnesium beidellite, metabentonite, montmorillonite, nontronite, otaylite, piotin, saponite, smectite, sauconite. The palycorskite group is: attapulgite, calciopalygorskite, floridin-floridine, gumbrine, lasallite, meerschaum, palygorskite, α-palygorskite, β-palygorskite, paramontmorillonite, parasepiolite, and sepiolite. Various types of fuller's earth may be included.

Natural zeolites such as chabazite may also be useful. Ground-up fire clay or fire brick may also be used as an absorbent, as may incinerated sewage solids. Fly ash and cement dust, which are industrial wastes and by-products, also have absorptive properties. Vermicullite and green sand as well as attapulgites may also be mentioned as specific types of useful silicates.

As is known in the art, the permanent membrane surface may be formed in several different ways, most commonly the membrane is formed from a cellulose acetate solution cast onto a porous substrate. The porous substrate may be tubular, fiber-glass reinforced, spiral wound, or flat. It may be externally coated and/or channel spaced. By a "permanent membrane" I mean to include a renewable membrane. Although the use of any semipermeable membrane may be improved by my invention, it is believed the most practical results will be attained with those having water permeability rates (referred to elsewhere herein as "standard," i.e., from a 5,000 ppm NaCl solution at 20°C under 800 psi) of from about 7 gallons per square foot per day to about 16 gallons per square foot per day.

A preferred precoat composition includes 5 to 75 percent adsorbent and 95 to 25 percent absorbent. The precoat composition may be placed upon the membrane surface in any convenient manner.

In a further preferred system, wherein the weight ratio of clay (absorbent) to activated carbon (adsorbent) is from 40 to 60 to 60 to 40, and wherein the medium to be treated is a typical sewage containing about 200 to 300 ppm BOD as suspended solids, I have found that a minimum pressure of about 115 psi is necessary to retain the precoat on the membrane wall where the membrane has a standard water permeation rate of 12 gallons per square foot per day and a flux rate of at least 1 gallon per square foot per day will help in maintaining the precoat on the surface.

I prefer to form a coating on the membrane of about .01 milligrams to about 0.2 milligrams per square inch of membrane surface. This is sufficient to treat 0.022 gallons of raw sewage per square inch of membrane surface in a continuous operation of the process for about 8 hours. Other materials may require less precoat. The system is thereafter flushed as previously described.

The precoat composition definitely prolongs the period of relatively high flux rates; although the relation of precoat cycles to efficiency is largely a matter of choice, I have found it expedient to flush the system when the flux rate is reduced to about 75 percent of the original rate without precoat (and/or at the beginning of a cycle). With a typical sewage containing 300 ppm total organics, a reduction to 75 percent flux will require about seven hours; accordingly 3 cycles per day are recommended.

I do not intend to be restricted to the above illustrations and examples of my invention. It may be otherwise practiced within the scope of the following claims.

I claim:

1. In the treatment of raw sewage containing hydrophobic and greasy materials by passage through an ultrafiltration membrane such that there will be fouling of the membrane, the method of operation to preclude fouling thereof which comprises depositing upon said membrane a mixed coating of a solid adsorbent and a solid absorbent in a quantity of about 6 to 60 grams per 1,000 square feet of membrane, and passing through said coating a feed consisting essentially of the raw sewage, prior to contact of said feed with the membrane, to remove the membrane-fouling hydrophobic and greasy materials from said raw sewage.

2. Method of claim 1 in which the coating comprises about 6 to about 60 grams per 1,000 square feet of membrane.

3. Method of claim 1 in which the coating is removed when the flux rate at the initial pressure is reduced to about 75 percent of the original rate.

4. Method of claim 1 in which the semipermeable membrane is supported on the internal surface of a porous tube.

5. Method of claim 1 in which the membrane is supported on the outside surface of a porous tube.

6. Method of claim 1 in which the membrane is a strippable, removable membrane on a porous support.

7. The method of claim 1 in which the coating comprises a clay.

8. The method of claim 1 in which the coating comprises a clay and activated carbon.

9. The method of claim 8 in which the activated carbon has a surface area of at least 500 square meters per gram.

10. The method of claim 8 in which the weight ratio of the clay absorbent to activated carbon is from 60 to 40 to 40 to 60.

11. The method of claim 8 in which at least 80 percent of the coating will pass a 325 mesh screen.

12. The method of claim 8 where said coating includes up to 0.01 percent dispersant.

13. The method of claim 1 further characterized in that said coating and sorbed fouling materials are flushed from the membrane when there is a significant reduction in flux rate and the membrane surface is then cleaned with a proleolytic enzyme prior to again passing the raw sewage into contact with the membrane.

* * * * *